United States Patent [19]
Zink et al.

[11] Patent Number: 5,319,783
[45] Date of Patent: Jun. 7, 1994

[54] PROGRAMMABLE CONTROLLER WITH AN OPERATOR MESSAGING FUNCTION

[75] Inventors: Steven M. Zink, Hudson; Arthur P. Pietrzyk, Thomson; Michael E. Schultz, Euclid; Paul J. Tletski, Parma, all of Ohio

[73] Assignee: Allen-Bradley Company Inc., Milwaukee, Wis.

[21] Appl. No.: 744,609

[22] Filed: Aug. 13, 1991

Related U.S. Application Data

[63] Continuation-in-part of Ser. No. 332,653, Mar. 31, 1989, Pat. No. 5,042,002.

[51] Int. Cl.$^5$ ............................................. G06F 15/46
[52] U.S. Cl. ............................ 395/700; 364/DIG. 2; 364/926.9; 364/949; 364/927.5
[58] Field of Search .............................. 395/155, 700; 364/DIG. 2

[56] References Cited

U.S. PATENT DOCUMENTS

| | | | |
|---|---|---|---|
| 3,974,484 | 8/1976 | Struger et al. | 340/172.5 |
| 4,302,820 | 11/1981 | Struger et al. | 364/900 |
| 4,442,504 | 4/1984 | Dummermuth et al. | 364/900 |
| 4,742,443 | 5/1988 | Rohn et al. | 364/136 |
| 4,858,101 | 8/1989 | Stewart et al. | 364/131 |
| 4,858,102 | 8/1989 | Lovrenich | 364/136 |
| 4,876,664 | 10/1989 | Bittorf et al. | 364/900 |
| 4,937,777 | 6/1990 | Flood et al. | |

OTHER PUBLICATIONS

Book entitled *Zone Logic* by Ralph Roberts, 1989 Aug. 1987 issue of *Control Engineering Magazine* article entitled "Distributed Machine Control Uses Zoned Logic, Isolated Controllers, Fiber Optics".

Master's thesis from the Massachusetts Institute of Technology entitled "A CRT-Based State Transition Language for Industrial Sequential Control" dated Jun. 1981.

*Primary Examiner*—Thomas M. Heckler
*Attorney, Agent, or Firm*—Quarles & Brady

[57] ABSTRACT

A programmable controller senses the status of input devices and controls the state of operating devices in accordance with a stored ladder logic control program. A memory of the programmable controller contains message data and data defining a set of expected transitions of the status of selected input devices. An instruction of the ladder logic initiates execution of a machine language message program which causes the programmable control to inspect the states of the selected input devices to determine whether an expected transition has taken place. When one of the expected transitions occurs, the message data and an identification of the selected input device are sent to a personal computer connected to the programmable controller. The personal computer uses the the data from the programmable controller to formulate an alphanumeric message which is presented to the operator on a display device.

15 Claims, 9 Drawing Sheets

PROGRAMMABLE CONTROLLER WITH AN OPERATOR MESSAGING FUNCTION

This is a continuation-in-part of U.S. patent application Ser. No. 07/332,653 filed on Mar. 31, 1989.

The present invention relates to electronic controllers for operating industrial equipment, such as a programmable controllers disclosed in U.S. Pat. No. 3,974,484; and more particularly to electronic controllers which send messages to the operator regarding the functioning of the equipment.

BACKGROUND OF THE INVENTION

Programmable controllers are well known devices for operating industrial equipment, such as assembly lines and machine tools, in accordance with a stored program. In such controllers, the control program is stored in a memory and includes instructions which are read out in rapid sequence and executed to examine the condition of selected sensing devices on the controlled equipment, and to energize or deenergize selected operating devices on the controlled equipment contingent upon the status of one or more of the examined sensing devices. Other instructions are provided not only to manipulate single-bit input and output data representing the state of the sensing and operating devices, but also to perform arithmetic operations, timing and counting functions, and more complex processing operations.

Such instructions have become quite standardized in the industry and they are directly associated with the elements of a ladder logic diagram which is easily understood by control engineers. Program panels such as those, described in U.S. Pat. Nos. 3,798,612; 3,813,649 and 4,070,702 have been developed to assist the user in developing and editing ladder logic control programs comprised of these programmable controller instructions.

Users of programmable controllers desire a mechanism to inform the operator of the controlled equipment when a fault occurs or when servicing is required. For example, a sensor can be provided to detect when the level of lubricant in a reservoir has dropped to a level at which replenishing is required. It is desirable for the programmable controller to send a message informing a maintenance person that the lubricant is at a low level. In another case, the controller could count the number of machining operations performed by a given bit, and notify a machinist that the bit is approaching the point where sharpening typically is required.

Ladder logic instructions have been devised to transmit data from the programmable controller over a communication network to another device, such as a host computer. These instructions commonly are used to send information regarding the manufacturing process, such as the number of workpieces processed by the controlled equipment or data acquired by the controller from its sensing devices. However, in order to use this capability the user of the system had to create numerous rungs of the ladder logic program in order to send even a simple message and users did not find this feature easy to use. The complexity of the previous messaging techniques tended to discourage individuals from sending messages to warn of low fluid levels, dulling machine bits and the like.

SUMMARY OF THE INVENTION

A programmable controller has a processor which executes instructions of a stored control program. The execution of the control program examines the status of input devices connected to the controller and operates external output devices in accordance with the condition of selected input devices. The programmable controller includes a first memory which stores the user control program. A set of storage locations in the first memory stores data for a plurality of messages with the data for each message including an identification of the processor means and a defined state of a selected input device. A means also is provided for transmitting message data over a communication link connected to the controller.

In response to an instruction of the control program, the processor means determines, from data in the input image table, when a selected input device is in the state defined by data in the storage locations. Upon that occurrence, message data associated with the selected input device is sent from the memory to said means for transmitting.

In the preferred embodiment of the present invention, the message data is transmitted over the communication link to an apparatus which displays messages to an operator of the programmable controller. In this case, the apparatus receives the identification of the processor module which caused the message data to be sent and an indication of the selected input device that initiated the transmission. The apparatus uses the message data to formulate an alphanumeric message which then is displayed to the operator. For example, the apparatus can select message text that was previously stored in the apparatus memory along with a designation that the text was associated with the selected input device. In a large manufacturing system a single message display apparatus can be associated with a number of programmable controllers. The identification of the processor module received with the message data enables the apparatus to select the appropriate message text.

An object of the present invention is to provide a mechanism by which a programmable controller can send messages to an operator.

Another object is to provide such a messaging mechanism as a machine language program that is executable from a conventional ladder type control program.

A further object is to provide a message to the operator which indicates the existence of a given condition of the machine being controlled by the programmable controller. The present invention also can be enhanced to provide an indication to the operator when the condition no longer exists.

DETAILED DESCRIPTION OF THE INVENTION

The present concept relates to providing a programmable controller with the capability to generate and send messages to a human operator. For example, the messages can inform the operator about a condition of the machine being controlled by the programmable controller, which requires the operator's attention. In order to understand the operation of the messaging function, an understanding of the hardware for a typical programmable controller will be beneficial.

Figure 1:
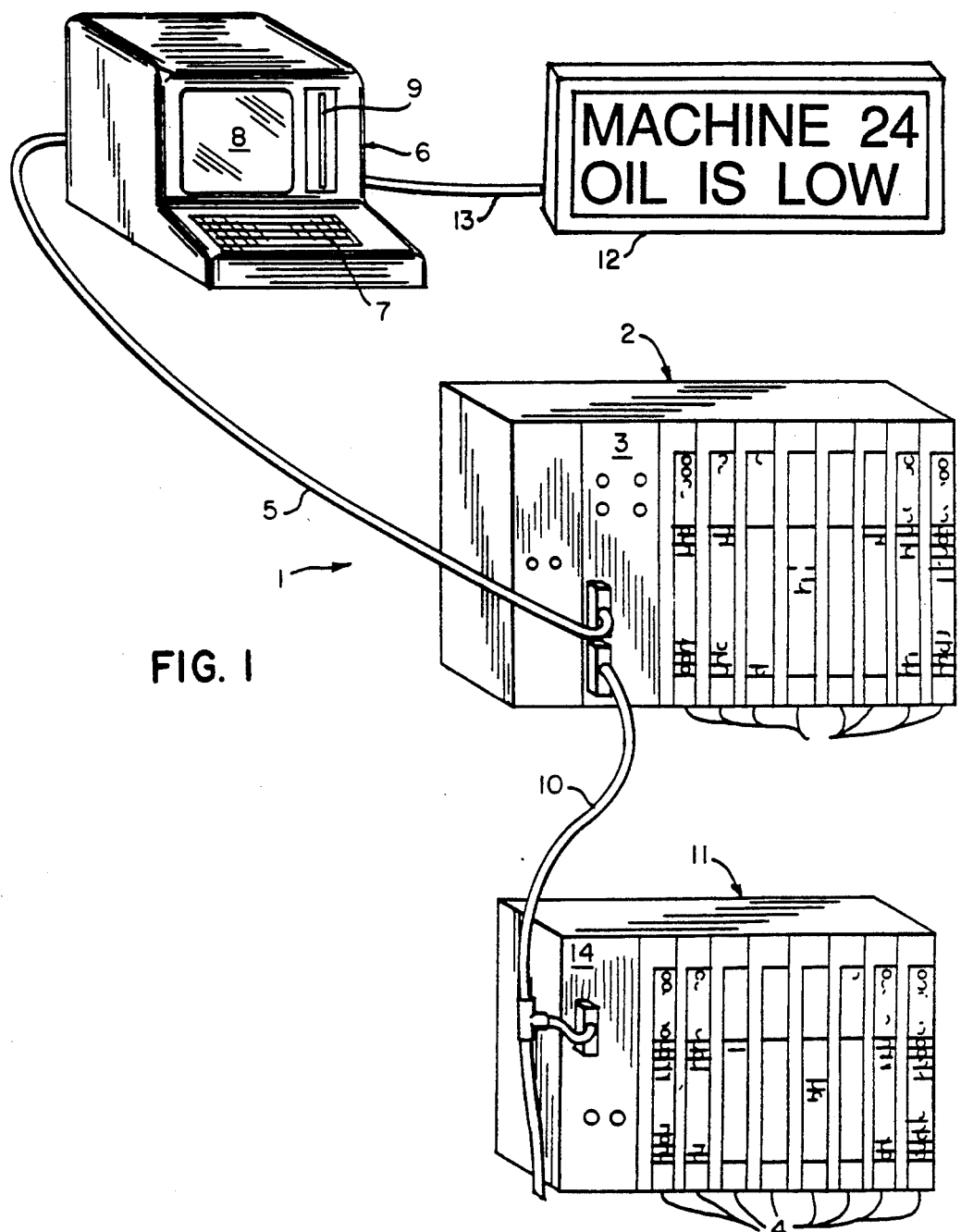
FIG. 1 is a perspective view of a programmable controller which employs the present invention.

Referring to FIG. 1, the programmable controller 1 which implements the present invention includes a local rack 2 having a power supply and series of slots that receive modules 3-4. These modules connect to a motherboard which extends along the back surface of the local rack 2 to provide a backplane. The modules include a processor module 3 and a series of up to eight input or output (I/O) modules 4. The I/O modules 4 take many forms and may interface with d.c., a.c., or analog input/output devices, or open and closed loop positioning modules, for example.

The processor module 3 is connected via a serial communication cable 5 to a personal computer 6. The communication cable 5 can be a direct link to the personal computer or a local area network to which the computer connects. The personal computer 6 includes a keyboard 7 through which the user may enter instructions for the processor module 3 and a disk drive 9 for data storage. Alphanumeric data, as well as ladder diagram representations of user control programs, are displayed on a CRT 8. As will be described in detail, the personal computer 6 executes control program editing software that enables a user of the programmable controller to construct the different types of programs which then are transferred into the programmable controller 1. While the machine is being controlled, the personal computer 6 receives message data from the processor module 3 and formulates human readable messages. These messages can be displayed on the CRT display 8 of the personal computer or sent over another communication network 13 to other devices, such as a marquee display 12.

The marquee display 12 is a conventional device for presenting alphanumeric messages in large characters. For example, a message having up to eighty characters can be displayed on this type of device. The marquee display 12 typically is mounted along an assembly line adjacent to the machine being controlled. Additional marquee displays or other display devices can be connected to the communication responsibility for the machine's operation will be able to read the messages. For example, another display device can be located in the maintenance shop of the factory to receive messages regarding repairs or servicing required by the machine. As will be described a given message can be addresses to a specific display device on the communication network 13.

The processor module 3 also is connected through cable 10 to a remote I/O rack 11. The I/O rack 11 is similar in construction to the local rack 2 and contains a similar assortment of I/O modules 4 which connect through a backplane motherboard to an I/O adaptor module 14. The I/O adaptor module is described in U.S. Pat. No. 4,413,319 and it functions to couple data between the I/O modules 4 in rack 11 and the processor module 3 in the local rack 2. Additional remote I/O racks 11 may be connected to cable 10.

As will be explained in more detail below, the user enters a control program into the memory of the processor module 3 through the personal computer 6. The processor is then placed in the "RUN" mode in which it repeatedly executes the stored control program to operate output devices connected to output modules 4 in the racks 2 and 11 in response to the condition of input devices connected to input modules 4. The circuitry of the processor module 3 and its basic operating software are described in detail in U.S. Pat. No. 4,742,443 entitled "Programmable Controller With Function Chart Interpreter", which description is incorporated by reference herein. However, in order to understand the present invention, an overview of the processor will be presented.

PROCESSOR HARDWARE

Figure 1A:
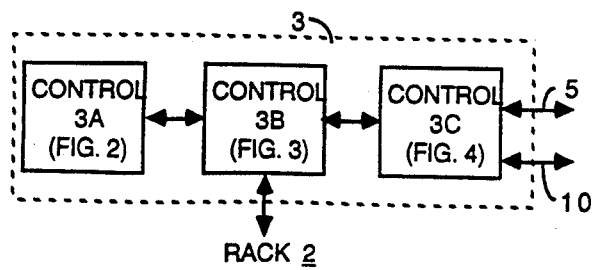
FIG. 1A is a block diagram of a processor module which forms part of the controller of FIG. 1.
Figure 2:
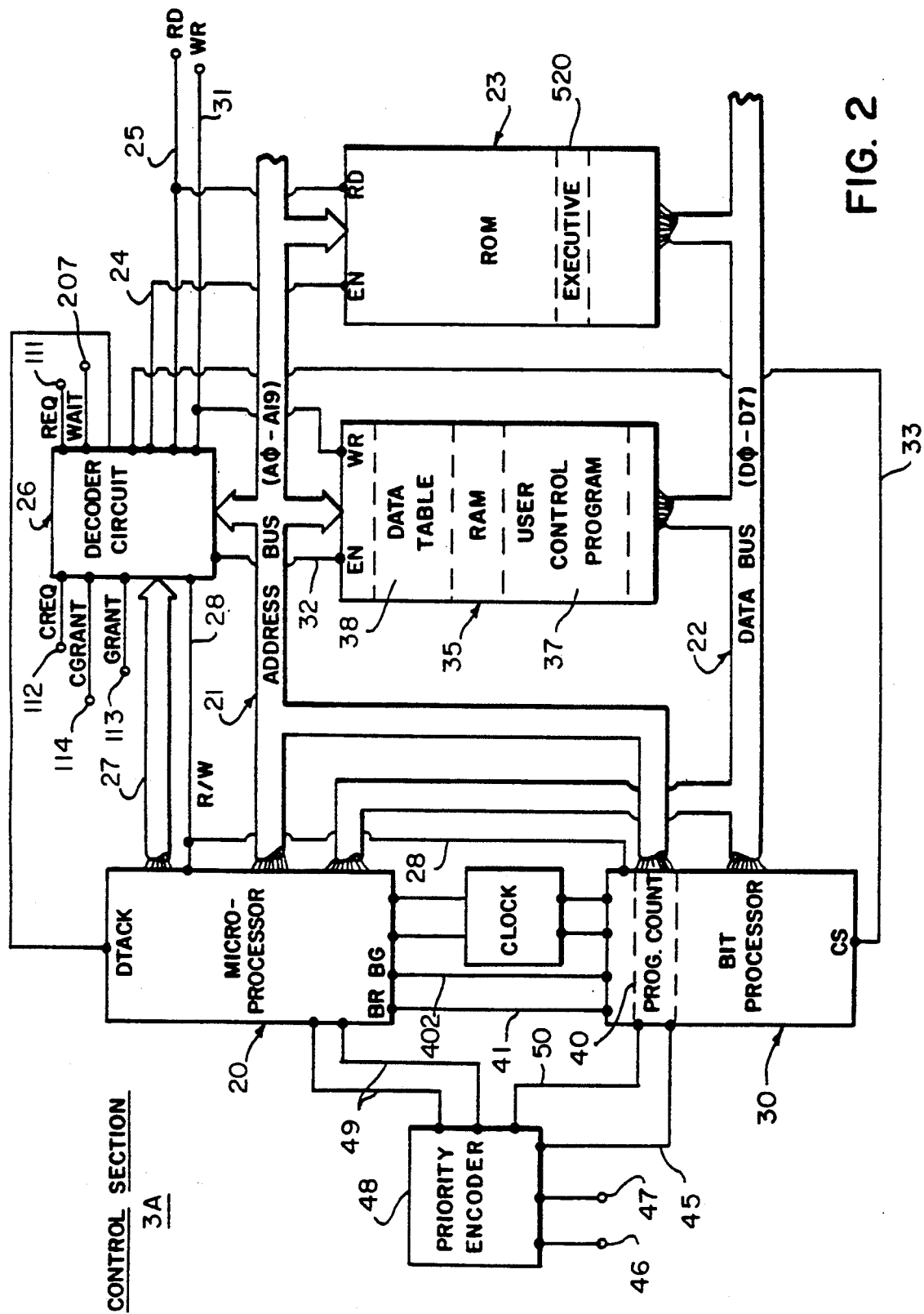
FIG. 2 is an electrical schematic diagram of a control section of the processor module of FIG. 1A.
Figure 3:
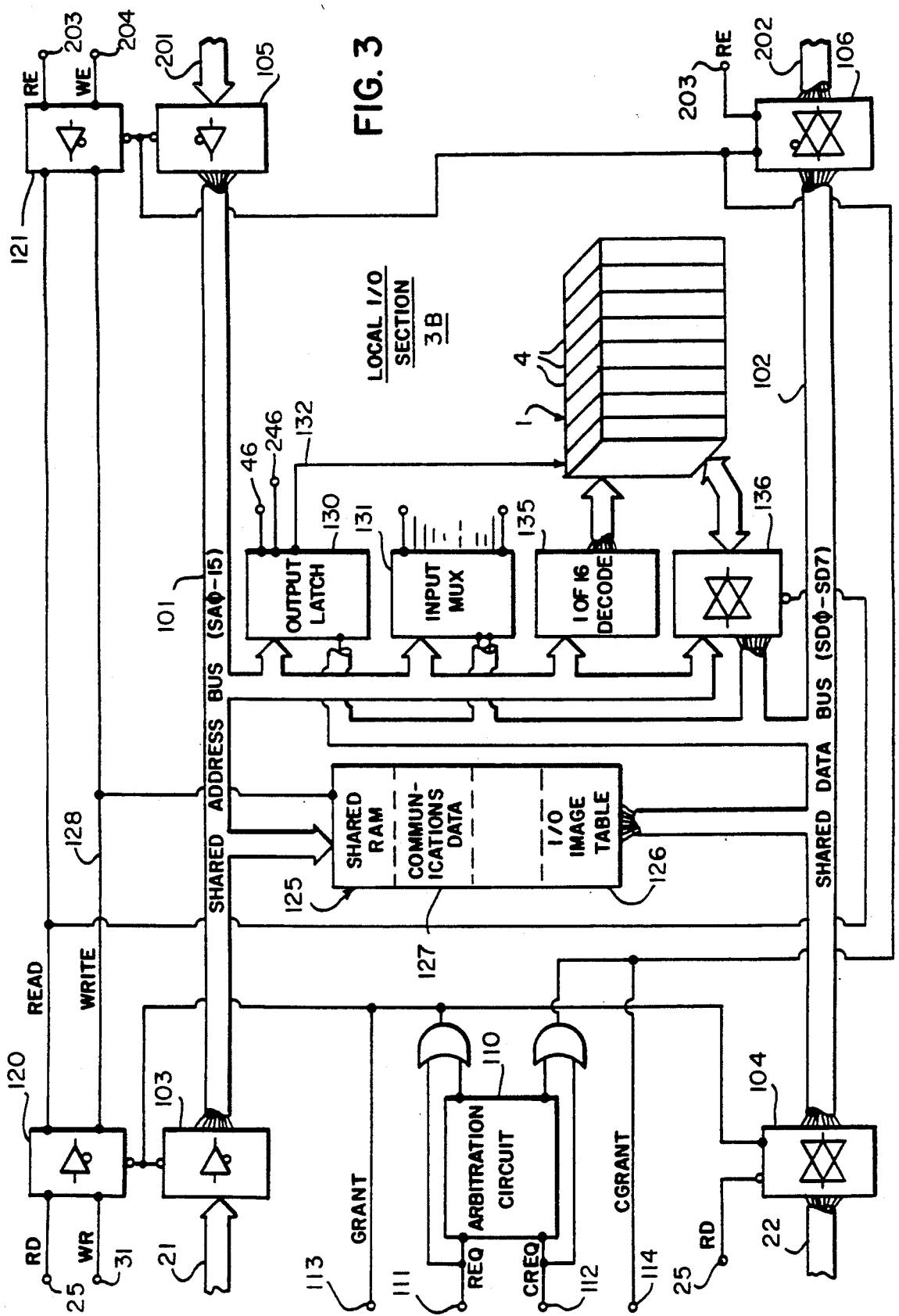
FIG. 3 is an electric schematic diagram of a local I/O section of the processor module of FIG. 1A.
Figure 4:
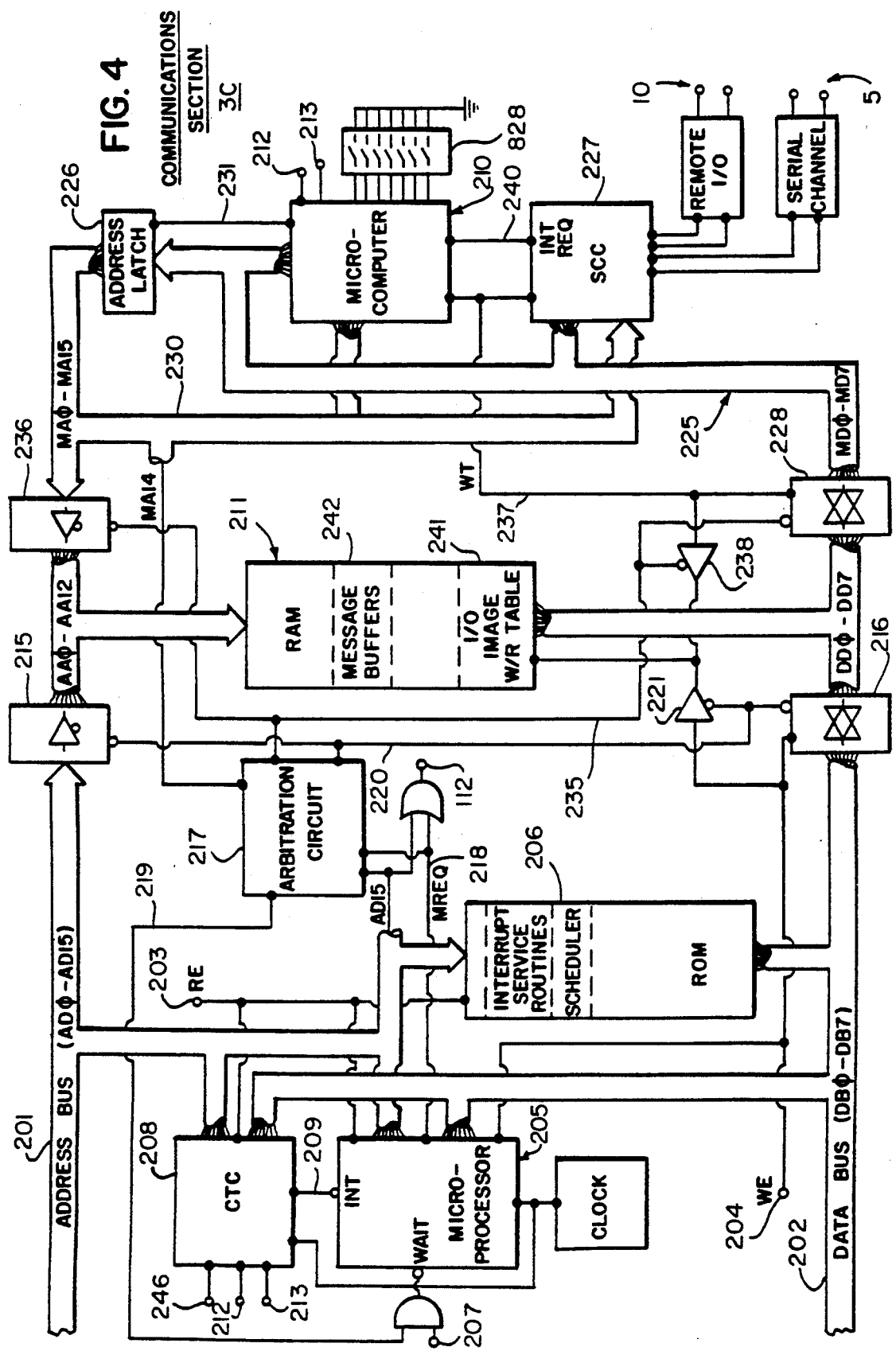
FIG. 4 is an electrical schematic diagram of a communication section of the processor module of FIG. 1A.

Referring to FIG. 1A, the processor module 3 is logically divided into three sections; a control section 3A shown in FIG. 2; a local I/O section 3B shown in FIG. 3; and a communications section 3C shown in FIG. 4. The control section 3A is primarily responsible for storing and executing the user's control program. The communications section 3C has the principal responsibility for communicating with the personal computer 6 and the remote I/O racks 11, and the primary functions of the local I/O section 3B are to communicate with the I/O modules 4 in the local rack 2 and to couple the control section 3A with the communications section 3C. Each of these sections of the processor module 3 will now be described in more detail.

Referring particularly to FIG. 2, the control section 3A is structured about a sixteen-bit microprocessor 20 which drives a twenty-lead address bus 21 and an eight-lead data bus 22. The microprocessor 20 executes machine language instructions, which are stored in a read-only memory (ROM) 23, to carry out its functions. These machine language instructions are addressed by a program counter in the microprocessor 20 and are read from the addressed storage location of the ROM 23 when an enable control line (EN) 24 and a read control line (RD) 25 are active. The fetched instruction is decoded and executed by the microprocessor 20 to carry out the indicated function.

Data may be read from or written to other components of the processor module 3 which are connected to the buses 21 and 22. The particular component is enabled by a decoder circuit 26 which receives address data from the address bus 21 and control signals from a control bus 27 that is driven by the microprocessor 20. The decoder circuit 26 also receives a signal from a R/W control line 28 which may be driven either by the microprocessor 20 or a separate bit processor 30, and it receives a number of other input signals which will be described in more detail below. In addition to the RD control line 25 and the ROM enable control line 24 described above, the decoder circuit 26 drives a write enable (WR) control line 31, a RAM enable control line 32, and a bit processor enable line 33. The other inputs to and outputs from the decoder circuit 26 will be discussed below in connection with the local I/O section 3B.

A random access memory (RAM) 35 connects to the buses 21 and 22, and data may be read from or written to an addressed location therein when the RAM enable control line 32 is active. The RAM 35 stores a variety of data structures which will be described in more detail below. However, most of these structures form part of a user control program indicated at section 37 or a data table indicated at section 38. The user control program includes one or more ladder logic programs that are comprised of instructions which are familiar to users or programmable controllers and which are loaded into the RAM 35 through the personal computer 6. The user control program 37 also includes a messaging routine which is unique and which is described in greater detail subsequently. The microprocessor 20 executes the user control program, and depending on its type, a ladder program instruction may be executed either by the microprocessor 20 or the bit processor 30, as is well known.

When the microprocessor 20 executes a control program instruction, it employs an operation code in the instruction to locate a corresponding machine language interpreter routine which is stored in the ROM 23. The microprocessor 20 thus executes ladder program instructions by executing corresponding interpreter routines stored in the ROM 23. This interpretive technique for executing ladder programs is described in U.S. Pat. Nos. 4,165,534; 4,282,584 and 4,443,865.

The bit processor 30 is a custom integrated circuit which operates in tandem with the microprocessor 20 to execute directly selected ones of the ladder program instructions. The microprocessor 20 begins the execution of the ladder program (i.e. the program scan), but it immediately relinquishes control to the bit processor 30. This transfer of control is accomplished by writing the address of the ladder program instruction to a ladder program counter register 40 in the bit processor 30. The bit processor 30 then effectively removes the microprocessor 20 from the buses 21, 22 and 27 by enabling a bus request terminal through control line 41. The bit processor 30 fetches the ladder program instruction, executes it, and fetches subsequent ladder program instructions and executes them until one is encountered which it cannot execute. At that point, the bus request line 41 is released and the microprocessor 20 resumes control of program execution. The microprocessor 20 reads the contents of the ladder program counter register 40 into its own ladder program counter and proceeds to fetch and execute the indicated ladder program instruction. While the bit processor 30 is constructed to execute only a few "bit oriented" instructions, 75 to 95 percent of typical user ladder programs are comprised of these instructions. As a result, the total program scan time is significantly reduced by executing these few instruction types within the dedicated, high-speed bit processor 30.

The bit processor 30 also includes a real time clock (not shown in FIG. 2) which produces an interrupt signal on control line 45 at regular intervals. This interrupt request, as well as two others on lines 46 and 47, are applied to the inputs of a priority encoder 48. The priority encoder 48 produces a two-bit interrupt request to the microprocessor 20 on lines 49, and indicates an interrupt request to the bit processor 30 through line 50. If the bit processor 30 has control at the moment of an interrupt request, it relinquishes control to the microprocessor 20 in the manner described above. The interrupt produced by the bit processor 30 is employed to implement a real time interrupt instruction as described in U.S. Pat. No. 4,638,452. The interrupt on line 46 emanates from the communications section 3C of the processor module 3 and it will be described in more detail below. The interrupt on line 47 is produced when a power loss is occurring, and in response, the microprocessor 20 takes certain emergency actions to insure that the system halts gracefully.

Referring particularly to FIG. 3, the local I/O section 3B of the processor module 3 connects to the address bus 21, data bus 22 and control lines 25 and 31 in the control section 3A described above. The local I/O section 3B is structured about a sixteen-lead shared address bus 101 and an eight-lead shared data bus 102. The shared address bus 101 may be driven by the address bus 21 when a set of tri-state gates 103 are enabled, and data may be conveyed between the shared data bus 102 and the data bus 22 when bi-directional gates 104 are enabled. The direction of data transfer is determined by the state of the RD control line 25 which is driven by the decoder circuit 26 in the control section 3A.

Similarly, a set of tri-state gates 105 connect the shared address bus 101 to an address bus 201 in the communications section 3C, and a set of bi-directional gates 106 connect the shared data bus 102 to a data bus 202. The shared address bus 101 may, therefore, also be driven by the communications section 3C of the processor module 3 and data may thus be transferred between the data buses 102 and 202 in a direction indicated by an RE control line 203.

An arbitration circuit 110 determines which section of the processor module 3 may have access to the shared buses 101 and 102. The circuit 110 may receive a request signal from the control section 3A through REQ line 111 (decoder circuit 26 in FIG. 2) or it may receive a request from the communications section 3C through a CREQ control line 112. The arbitration circuit grants the request to one section at a time by producing a signal either on a GRANT line 113 or a CGRANT line 114. Both of these signals are conveyed to inputs on the decoder circuit 26 in the control section 3A (FIG. 2) and they are employed to enable the respective gates 103, 104, and 120 or gates 105, 106 and 121. In this manner, either the control section 3A or the communication section 3C of the processor module 3 may have access and control of the local I/O section 3B.

The local I/O section includes a random access memory (RAM) 125 which connects to the shared address bus 101 and shared data bus 102. The shared RAM 125 stores data which is passed back and forth between the two other sections of the processor module 3, and it includes a remote I/O image table 126 and communications data 127. Data may be written to or read from an addressed location of the shared RAM 125 when the RAM 125 is enabled by address bus lead SA11 and a WRITE control line 128 is active. The WRITE control line 128 is driven by the processor section 3A or 3C which has ben granted control of the shared buses 101 and 102, and indeed, the shared RAM 125 occupies the same address space in each of these sections.

Referring still to FIG. 3, the local I/O section 3B also includes an eight-bit output latch 130 and a sixteen-bit input multiplexer 131. The output latch is enabled by address bus lead SA13 and the status of data bus lead SD0 may be written to one of the eight outputs as selected by the state of the three address bus leads SA0—SA2. One of these outputs drives the interrupt control line 46 connected to the priority encoder 48 (FIG. 2) and another output drives an interrupt control line 246 which produces a similar interrupt in the communications section 3C. Thus, by writing to the output latch 130 either section 3A or 3C of the processor module 3 may interrupt the other section, or even itself. A third output 132 from the latch 130 drives an I/O reset line which connects to each I/O module 4 in the local rack 2 via the motherboard. This output may be operated to disable all operating devices controlled from the local rack 2.

The input multiplexer is enabled by address bus lead SA14 and the state of any two of the sixteen inputs are read onto data bus leads SA0–SA2. These inputs monitor the battery back-up and a variety of switches which indicate alternative functions that may be implemented.

The shared buses 101 and 102 are also coupled to the backplane of the local rack 2 by a one of sixteen decoder 135 and a set of bi-directional gates 136. An eight-bit byte of data may be written to or read from any one of sixteen I/O slots in the local rack 2 when the address bus lead SA12 is enabled. The addressed slot is identified by the select code on address bus leads SA1–SA4. There are two I/O slots in each of the eight I/O modules 4 located in the local rack 2 and either the control section 3A or the communications section 3C of the processor module 3 may thus read or write to any one of them.

The local I/O section 3B of the processor module 3 serves as a link between the other two sections. For example, the control section 3A periodically reads the state of the input devices connected to the local rack 2; updates its I/O image table 38 in the RAM 35 with this information; updates the output devices connected to the local rack 2; writes output data from its data table 38 to the I/O image table 126; and updates its data table 38 with the inputs from the I/O image table 126. The communications section 3C periodically updates the input section of the I/O image table 126 in the shared RAM 125 with the status of the input devices connected to the remote I/O racks 11 and reads the output portion of the I/O image table 126 for transmission to the output devices connected to the remote I/O racks 11. Personal computer messages which are received by the communications section 3C are stored in the communications portion 127 of the shared RAM 125 and any responsive messages from the control section 3A are read therefrom.

Referring particularly to FIG. 4, the communications section 3C of the processor module 3 is structured about an eight-bit microprocessor 205 which drives the address bus 201 and the data bus 202. The microprocessor 205 operates in response to machine language program instructions which are stored in a read-only memory (ROM) 206 to carry out most of the communication section functions.

When the microprocessor 205 generates an address code on the bus 201 in which lead AD15 is active, a request is made through control line CREQ 112 for access to the local I/O section 3B. As indicated above, this request is applied to the arbitration circuit 110 in the local I/O section 3B (FIG. 3) and to the decoder circuit 26 in the control section 3A (FIG. 2). The decoder circuit 26 responds by generating a signal on a WAIT control line 207 which places the microprocessor 205 in a wait state until access is granted by the arbitration circuit 110. When access is granted, the decoder circuit removes the signal from WAIT control line 207, and the microprocessor 205 may then perform memory read and write operations on data stored in the shared RAM 125. Only a momentary pause in its operation occurs when the shared RAM 125 is already being accessed by the control section 3A.

A major function of the communications section 3C is to link the two serial channels 5 and 10 with data structures in the shared RAM 125. These are high speed channels and to facilitate the handling of interrupts from them, an eight-bit microcomputer 210 is employed. The microcomputer 210 includes an internal masked ROM (not shown) which stores machine language instructions that direct its operation. The microcomputer 210 shares an 8K by eight-bit random access memory (RAM) 211 with the microprocessor 205 and its primary function is to handle all interrupts from the serial channels 5 and 10 and couple data between these channels 5 and 10 and the RAM 211. The microprocessor 205 then transfers this data between the RAM 211 and the shared RAM 125 in the local I/O section 3B.

Referring still to FIG. 4, a counter/timer circuit (CTC) 208 connects to the buses 201 and 202 and to an interrupt terminal 209 on the microprocessor 205. The CTC 208 receives interrupt requests from the local I/O section 3B via control line 246 and interrupt requests from the microcomputer 210 through control line 212. The CTC 208 may produce an interrupt request on control line 213, and it is also configured as a timer which produces an interrupt request on the lead 211 every ten milliseconds. In response to an interrupt request from the CTC 208 which directs the microprocessor 205 to the appropriate interrupt service routine stored in the ROM 206.

The microprocessor 205 is coupled to the RAM 211 by a set of thirteen bus drivers 215 and a set of eight, bidirectional data gates 216. When the RAM 211 is addressed by the microprocessor 205, an arbitration circuit 217 is signaled by address bus lead AD15 and an MREQ control line 218. The arbitration circuit 217 places the microprocessor 205 in a wait state through control line 219 until access to the RAM 211 may be granted. At that point, the gates 215 and 216 are enabled through control line 220 and the microprocessor 205 is released from the wait state to complete either a read or write cycle to the RAM 211. The microprocessor's write enable control line (WE) 204 is coupled to the RAM 211 by a tri-state gate 221 to select either a read or write operation, and this same control line controls the direction of data flow through the gates 216.

The microcomputer 210 drives an eight-bit data bus 225 which connects to an address latch 226, a serial communications controller (SCC) circuit 227 and a set of eight, bi-directional data gates 228. It also drives eight higher order address lines which are combined with the lower order lines driven by the address latch 226 to produce an address bus 230. In a typical read or write cycle, the lower order address bits are stored in the address latch 226 when an address strobe line 231 is active and then the higher order bits are produced on the address bus 230 and data is conveyed through the data bus 225.

The microcomputer 210 may gain access to the RAM 211 in a manner similar to that employed by the microprocessor 205. When address bus lead MA14 is active, a request for access to the RAM 211 is made to the arbitration circuit 217. When access is granted, control line 235 is active and a set of bus drivers 236 and the bi-directional data gates 228 are enabled to couple the buses 230 and 225 to the RAM 211. A read or write cycle is executed, as determined by the state of WT control line 237, which is coupled to the RAM 211 by tri-state gate 238.

The SCC 227 is commercially available in integrated circuit form from Zilog, Inc. and it operates to service the two serial channels 5 and 10. When a byte of data is received at either channel 5 or 10, the SCC 227 interrupts the microcomputer 210 through a line 240 and the microcomputer 210 responds by reading a vector from the SCC 227 which points to the appropriate interrupt service routine stored in the microcomputer's internal ROM. The received byte of data may be combined with other received data to form a message from the personal computer 6 or it may form a block of status information from an I/O rack 11. In either case, the information is placed in the proper form by the microcomputer 210 and written to a communication I/O image table 241 or a message data section 242 of the RAM 211. Similarly, the microcomputer 210 may read data from the RAM 211 and place it in a form for transmission on either of the serial channels 5 or 10. A set of DIP switches 248 are connected to the micro-computer 210 to set the address of the processor module 3 on the communication channel 10.

This exemplary programmable controller 1, can be programmed to implement the present operator messaging function. For this purpose data defining a condition upon which to send the message has to be loaded into RAM 35 of the processor module 3. In addition, human readable text for the message must be stored in the personal computer 6 for display when the processor module signals that the condition exists.

SYSTEM DATA STRUCTURES

Referring particularly to FIG. 2, the processor module RAM 35 stores a number of data structures which are employed by the sixteen-bit microprocessor 20 and the bit processor 30 to carry out their functions. As indicated above, these include the system data table 38 and the user control program section 37 which are shown in more detail in FIG. 5.

The system data table 38 is comprised of separate data files, each of which contains data for performing a specific function in the operation of the programmable controller 1. Data file #0, for example, is an integer type file which functions as an output image table 260, and data file #1 is an integer type file which functions as an input image table 261. As in previous programmable controllers, the input image table 261 and the output image table 260 are images of the state of the I/O devices connected to the I/O modules 4 in racks 2 and 11. In the simplest form, each bit stored in the input image table 261 represents the state of a switch type input device and each bit of the output image table represents the on/off state of an operating device. In both image tables, a high logic level, or "one", bit indicates an active state and a low logic level, or "zero", bit indicates an inactive state. Data file #3 is also an integer type file which is dedicated to function as a status file 262. The status file 262 contains data defining the current status of the programmable controller system, such as arithmetic flags, timers, counters, real time clock and calendar data. As will be described, the status file data can be examined by a control program as indicating different operational parameters of the equipment being controlled. A set of Data Table Pointers 265 is stored in a file directory in RAM 35 and is used to access the data files.

Figure 5:
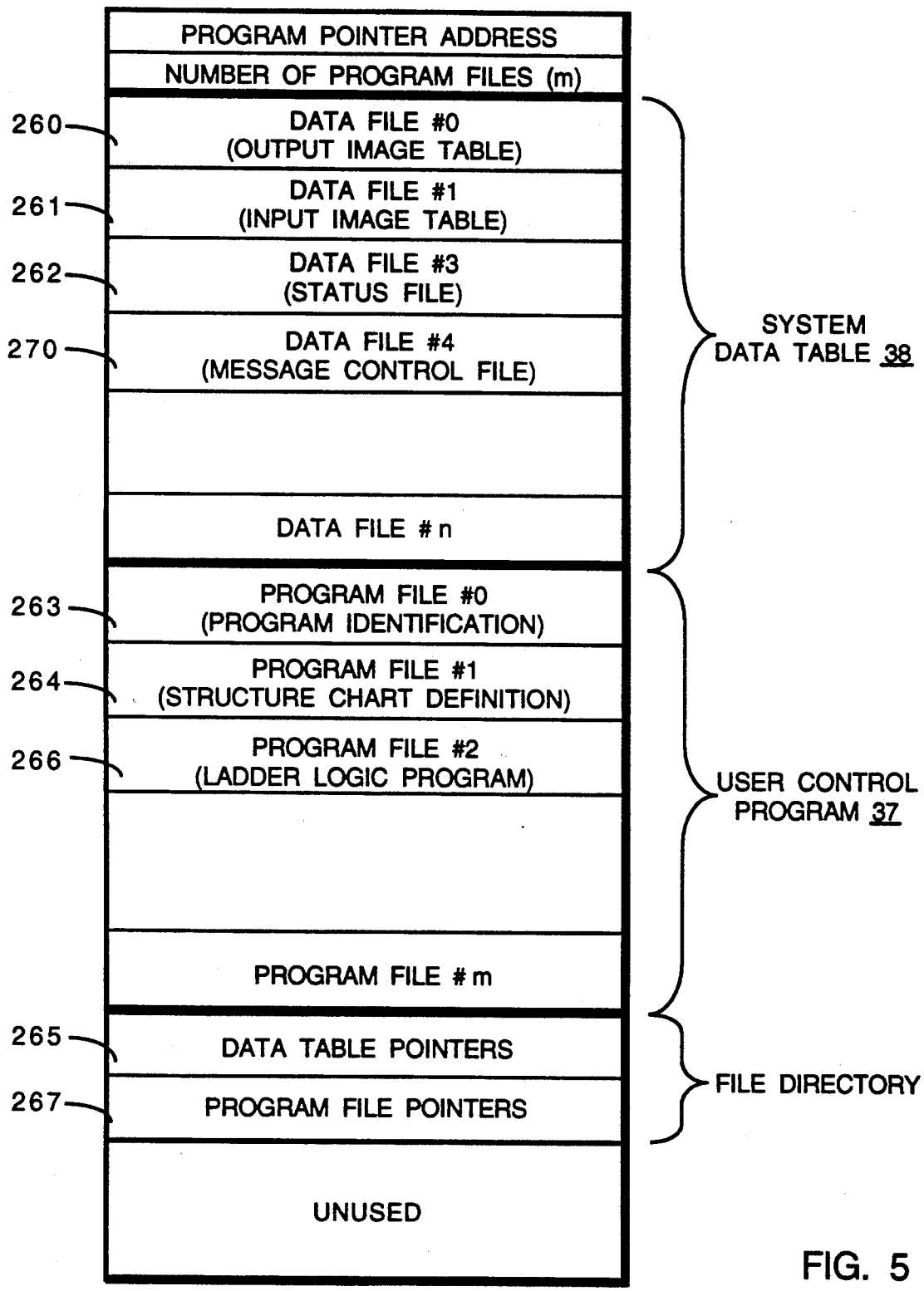
FIG. 5 is a memory map of a random access memory which forms part of the control section of FIG. 2.

The RAM 35 also stores the files which constitute the user defined control program 37, as illustrated in FIG. 5. Program files #0 and #1 are dedicated to specific functions, but the rest are variable in both type and size. Program file #0 is for program identification 263 and program file structure chart is the active structure chart definition 264, or structure chart program. Program file #2 contains a ladder logic control program that is "called" by the structure chart defined in file #1. Each program file in the user control program 37 is identified by a program file pointer 267 which is stored in the file directory section of the RAM 35. Each such pointer indicates the program file type, absolute memory starting address and length of the program. Each pointer also indicates if the file is write protected, and it provides a checksum of the program file which is employed as a diagnostic tool.

There are three types of program files: ladder, structure chart, and machine language. Ladder program files are executed by the processor module 3 and are comprised of instructions of the type which are conventionally found in programmable controllers. The term "ladder" is derived from the ladder logic diagram format which is used to display the program on the personal computer 6. The structure chart programs are executed by a structure chart interpreter routine similar to the one described in U.S. Pat. No. 4,742,443. Machine language program files contain instructions which are executable directly by the sixteen-bit microprocessor 20. These programs are employed to implement the dual language feature as described in U.S. Pat. No. 4,302,820.

Figure 6:
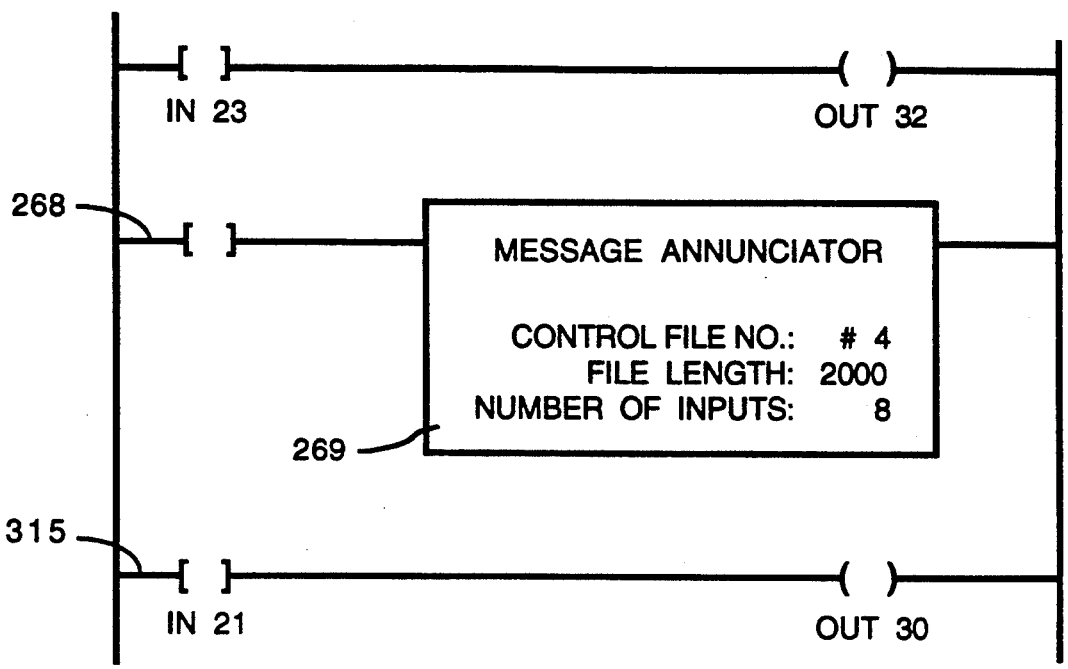
FIG. 6 is a representation of a rung of a ladder diagram control program, which incorporates the present messaging function, as the rung is displayed on a personal computer.

The present concept enhances the standard set of ladder diagram logic operations by adding a messaging function. During the formulation of a ladder logic control program on the personal computer 6, the user employs the personal computer's program editing software to construct a ladder diagram in much the same manner as in previous programmable controllers. The messaging function is selected by pressing an appropriate key combination on the keyboard 7 and a rung 268 as depicted in FIG. 6 is displayed on the CRT display 8. Rung 268 has an a message operation box 269 in which specifies the number of a control file 20 of the system data table 38 in RAM 35 which contains global information relative to message transmission. The number of inputs from the input image table 261 which are used in determining when to send a message is entered by the user in the message operation box 269. The programmable controller 1 can have several hundred I/O points and the messaging function operates on a subset of these points. In order to increase operating speed, the allocation of I/O points is limited to entries of 8, 16 or 32 inputs.

Once the user has filled in the information in the message block 269, the control program editing software in the personal computer 6 steps the user through other display screens which prompt the user to enter other data for the message control file. The data from the message block 269 and the other programming display screens are stored temporarily in files in the personal computer 6 and then transferred into RAM 35 of the processor module 3.

Figure 7:
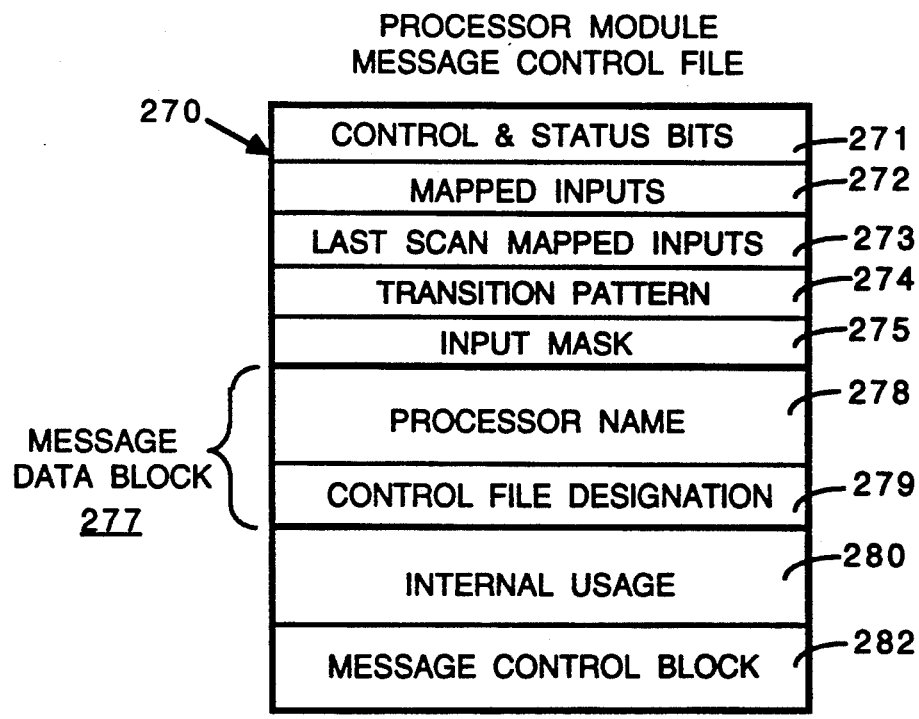
FIG. 7 depicts the data structure of the control file for the messaging function.

At the completion of the programming mode, the data table 38 of the processor module RAM 35 contains a message control file 270 having a structure depicted in FIG. 7. The first data block 271 of the message control file contains a word formed by control and status bits which among other things indicate whether specific processing options are enabled or disabled.

The next file data block 272 is provided to hold the state of programmable controller inputs which have been selected by the user as indicating when a message should be sent. This file block is 32 bits wide and represents a subset of the data in the input image table 261 for the message function. As will be described, the data bits representing the state of the input devices selected for the messaging function are copied (or mapped) from the main input image table 261 into the control file 270. The mapped input block 272 is update each time the message function rung in the ladder logic control program is executed. The mapped inputs from the previous, or last, scan of the rung are stored in control file block 273.

As will be described, a message is sent when the state of a defined mapped input bit makes a low to high or high to low transition. The designation of a rising or falling transition is specified in control file block 274 where a zero bit indicates a low to high transition and a one bit indicates a high to low transition. As noted above, the allocation of I/O points is limited to entries of 8, 16 or 32 inputs, but not all the bits may be used depending upon the number of messages being defined. To allow fewer bits to be used, control file block 275 contains an input mask which selects only the bits in block 272 which actually have been designated for messaging.

A Message Data Block 277 is provided in the control file 270 to store information identifying the origin of the message. This block is subdivided into two sections 278 and 279. The first section 278 holds a user provided alphanumeric name for the processor module 3. A designation of the message control file is contained in section 279 in order for the personal computer 6 to determine which one of possibly several messaging functions defined for the same processor module 3 sent a given message. The control file designation and the processor name are sent as part of the message data to identify the program mable controller and the specific ladder rung which resulted in a message being sent.

A group of words in data block 280 is assigned for internal usage as temporary storage locations and as a message buffer when several messages are to be sent. Finally, a message control block 282 in the control file 270 contains routing information for transmitting a message to the personal computer 6.

Figure 8:
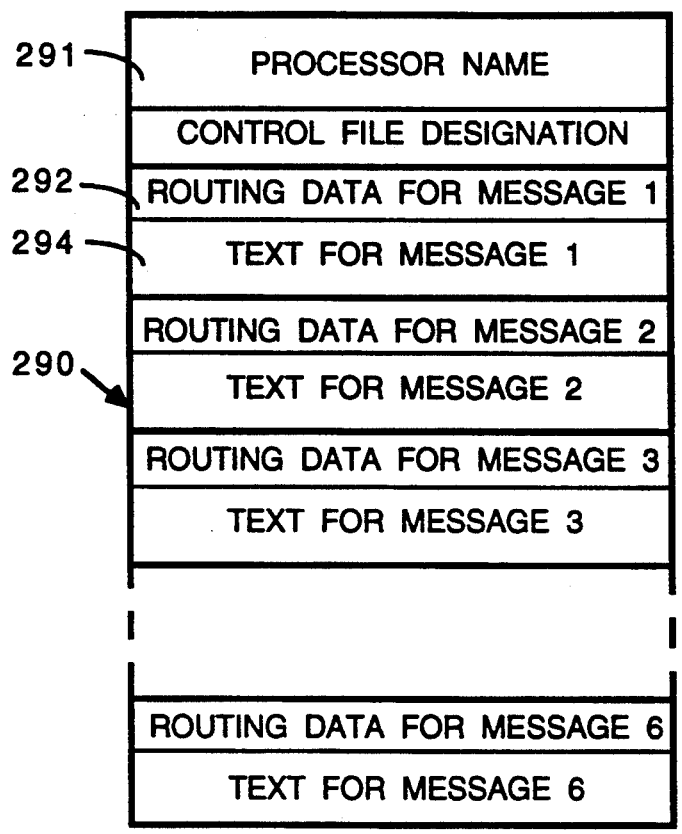
FIG. 8 depicts the data structure of the human readable message text stored in the personal computer.

The data structures described thus far are contained in the RAM 38 of the processor module 3 and are used to determine when to send an message to the operator. The actual human readable text for the message is stored in a file 290 in the disk drive 9 of the personal computer 6. An example of the structure of file 290 is depicted in FIG. 8 which contains the text for all the operator messages to be generated by the programmable controller 1 from ladder program rung 268. The exemplary file 290 has data for six messages. If the same personal computer 6 is connected to several programmable controllers for message generation, a separate message text file will exist for each controller. The message text file 290 contains the programmable controller name and the control file designation in portion 291 so that the message file for each programmable controller can be located on the disk.

Each time a message is defined by the user, the editing software asks the programmer to specify the communication port of the personal computer through which the message is to be transmitted and the communication parameters, e.g. baud rate and number of bits per character. The address of the receiving device, such as marquee display 12, also is specified. These data items are stored in a first data block 292 of the file area for the message. A second data block 294 contains the alphanumeric text characters for the message as specified by the programmer. These characters will be sent to the marquee display 12 when the associated message is being transmitted. In addition, each message is displayed on the CRT screen of the personal computer.

MESSAGE MECHANISM

During the programming phase, these various data structures are stored within the personal computer 6. At the completion of this phase, the ladder diagram control program and the data file 270 for the messaging function are transferred from the personal computer 6 to the processor module 3. Thereafter, the user can turn a switch on the front panel of the processor module to enter the RUN mode in which the programmable controller controls the operation of the machine.

The RUN mode for the present programmable controller 1 is similar to that of previous controllers in that the processor module 3 repeatedly executes or scans through the ladder diagram program. Prior to commencing a given scan, the input and output image tables 260 and 261 are updated by exchanging data with the I/O modules 4.

Figure 9:
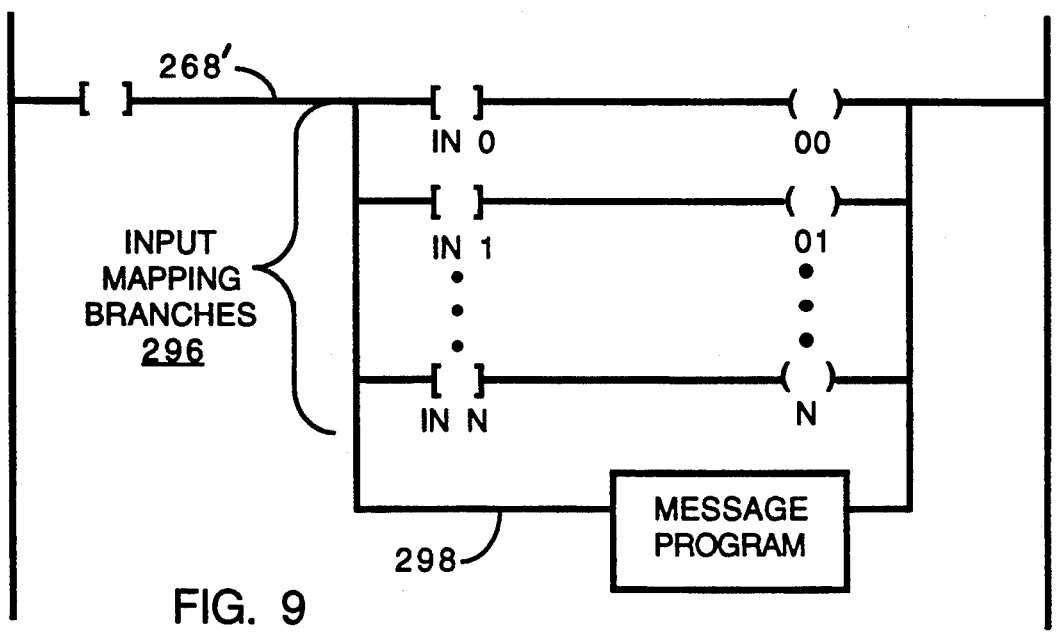
FIG. 9 represents the actual rungs of the portion of the ladder diagram control program for the messaging function.

Although the ladder diagram rung 269 containing the message function is displayed on the monitor 8 of the personal computer 6 as illustrated in FIG. 6, the actual program is stored as though the rung 268' had the configuration illustrated in FIG. 9. This rung contains a series of input mapping branches 296 in which the state of an input bit in the input image table 261 selected by the programmer is examined and transferred into one of the mapped input bits in block 272 of the programmable controllers message control file 270. Thus, at the commencement of the execution of the ladder diagram rung containing the message function, each of the mapped inputs in the message control file 270 is updated with the current state of that input bit from the input image table 260. Since the execution of a series of parallel branches in a ladder rung proceeds from top to bottom, as the run is displayed, the mapped inputs will be updated before the message program branch 298 is executed. When branch 298 of the ladder rung 268' is executed, a machine language routine is called which inspects the mapped inputs to determine whether a defined condition exists which indicates that a message should be transmitted. This machine language routine is different from the program that interprets the ladder diagram control program.

Figure 10:
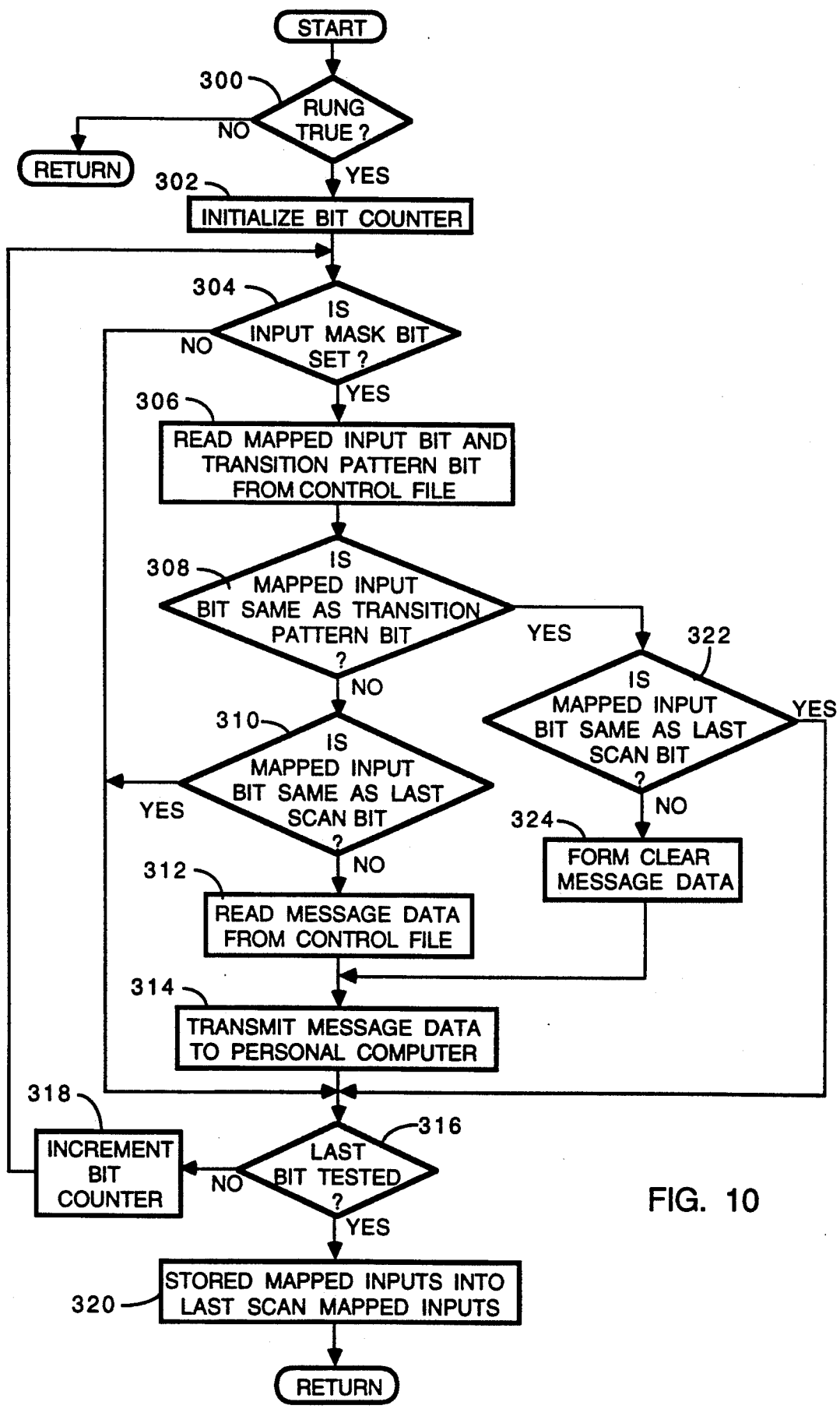
FIG. 10 is a flow chart of the programmable controller software for the messaging function.

With reference to FIG. 10, the execution of the machine language message routine commences at step 300 with microprocessor 20 inspecting a bit in the system status file 262 which indicates the truth of the messaging rung 268. The rung is held false during the prescan and postscan modes in which the inputs to the programmable controller 1 are examined but outputs are not altered. During normal running of the control program, the message function rung 268 will usually be true, allowing the program execution to advance to step 302. At this point, a counter is initialized in order to provide an orderly examination of each of the mapped inputs to determine whether a message should be sent.

The microprocessor 20 at step 304 examines the bit of the input mask which is designated by the bit counter. This bit will have been set to a high logic level when the corresponding mapped input bit has been used in the definition of a message. Thus, if the bit in the input mask stored in the message control file block 275 has a low logic level, indicating that the bit is not used in the messaging function, the program execution jumps around the steps 308-314 which would otherwise determine whether this bit indicates that a message should be sent. Assuming that the input mask bit is set to a high logic level, the program execution advances to step 306 where the microprocessor 20 obtains the associated mapped input bit and transition pattern bit from the message control file blocks 272 and 274 stored in RAM 35. The microprocessor 20 then compares these bits at step 308. As indicated previously, the mapped input bits have a low logic level when the corresponding input is off and a high logic level when that input is on. Similarly, the bits of the transition pattern have a high logic level when an on to off transition is expected and a low logic level when an off to on transition has been designated by the programmer. Thus, the designated transition may have occurred when the two bits being examined at step 308 are dissimilar. If the bits are dissimilar, indicating that the current state of the mapped input bit is the same as would occur if the proper transition has happened, the program execution advances to step 310 where the current state of the mapped input bit is compared with the state of that bit during the last scan of the messaging function rung 268.

It is possible that a transition was detected during a previous ladder program scan and the input bit has remained in the same state since then. In which case a determination must be made as to whether a transition has actually occurred since the last scan. This event is indicated by a comparison of the current status of the mapped input bit stored in the message control file block 272 and the state of the bit from the last scan as stored in block 273. If the bits from these two blocks are identical, a transition has not occurred since the last scan through the ladder diagram and a message should not be sent. In this event, the program execution branches to step 316, bypassing the transition of the message.

However, when the two bits examined at step 310 are dissimilar, the specified transition has occurred between consecutive scans of the message function rung 268. In this event, the program execution advances to step 312 where the message data from the control file 270 is read. Specifically, the data regarding the processor name and control file designation stored within the message data block 277 are obtained by microprocessor 20 from RAM 35 and sent to the communication section 3C together with an indication of the input bit which charged states. The microprocessor also provides information from the message control block 282 that specifies where to send the message data. The items of message data are formed into a packet and stored in the communications portion 127 of the shared RAM 125 (FIG. 3). Then at step 314, the communication section 3C transmits the packet of message data to the personal computer 6 over communication link 5.

Upon receiving the message packet from the processor module 3, the personal computer 6 uses the data in the packet and message text from the disk drive 9 to formulate a message for the operator. As the data is being received by the personal computer 6, it is executing a communication routine which passes the the message data from the packet and stores the data temporarily in a memory. When all of the message data have been received, the personal computer begins processing the message data at step 330. At this point, the temporarily stored message data are retrieved from the personal computer's memory and utilized to determine which of the message text files 290 stored within the disk drive 9 contains information related to the received message data. In doing so, the personal computer utilizes the designation of the processor module 3 and the message control file received with the message data to select the corresponding message text file 290 on the disk drive 9. The particular bit which made a transition then is utilized at step 332 to select and read the associated message text within the chosen text file 290.

The personal computer 6 then at step 334 formulates the message for display to the operator. For example, a message can be formed by concatenating the processor name and mapped input bit designation received from the processor module with the text for the message text read from the disk drive 9. The formulated alphanumeric message is stored temporarily within the memory of the personal computer 6. The message is displayed on the monitor 8 of the personal computer at step 235.

In many instances, the message also will be displayed on another device such as Marquee 12. The routing data for the message then is read from the disk drive 9 at step 336 and used at step 338 to create a packet for transmission over communication network 13 to the device which is to display the message. If there is no routing data the message only will be displayed on monitor 8. Otherwise, a conventional communication software routine is utilized to create a packet according to the particular protocol for the network 13. A message packet contains the designation or address of the recipient device such as the marquee display 12 and the concatenated message text. Then at step 338 the personal computer 6 transmits the message through the designated port over the communication network 13.

Figure 11:
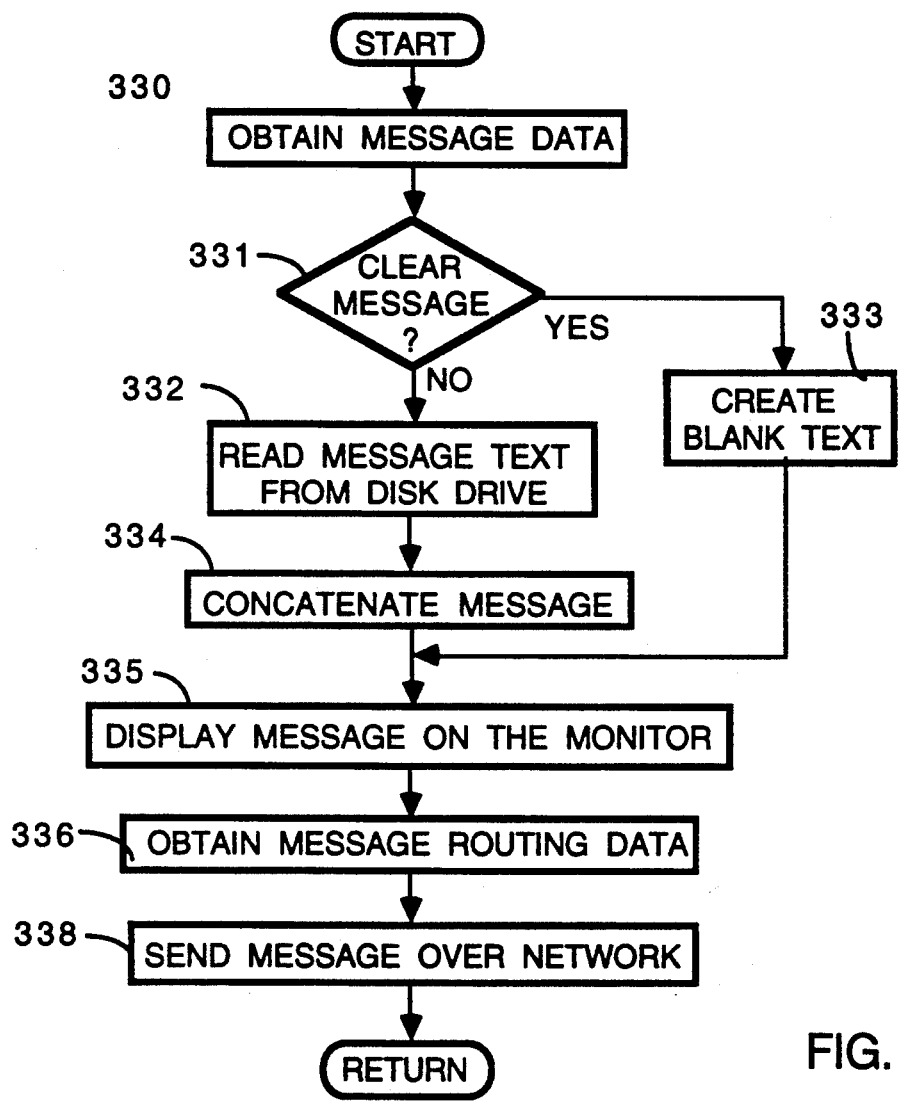
FIG. 11 is a flow chart of the messaging software for the personal computer.

A network interface circuit within the recipient marquee display 12 receives the information and displays it for view by the operator. Once the message has been received by the display 12, it is continuously displayed to the operator until a manual reset of the display occurs or a subsequent message is sent to the same display device. After the message has been transmitted, the personal computer 6 terminates the message formulation routine depicted in FIG. 11.

Referring once again to FIG. 10, after the processor module 3 has transmitted the message data to the personal computer at step 314, the program execution of the machine language routine for the messaging function advances to step 316. At this time, the microprocessor 20 examines the value of the bit counter to determine whether all of the bits of the mapped input have been examined. If so, the mapped inputs block 272 of the message control file 270 is copied into the last scan mapped inputs block 273 at step 320. The execution of the messaging machine language routine then terminates, returning the microprocessor to the execution of the ladder logic diagram interpreter and advancing to the next rung 315 of that program (FIG. 6).

However, if additional mapped input bits remain to be examined, the execution of the machine language messaging routine branches to step 318 where the bit counter is incremented. Thereafter the program returns to step 304 to process the next mapped input bit and determine whether another set of message data should be transmitted at this time.

Once message data has been transmitted, the processor module 3, via the periodic execution of the messaging function rung 268, continues to monitor the input bit to determine whether the condition which caused the message to be sent no longer exists. For example, a sensor may be provided for the programmable controller 1 to monitor the level of oil in a reservoir on the machine being controlled. When the level of lubricant drops below a given level, a message is generated and presented to the operator on a marquee display 12. Such a message similar to that shown in FIG. 1 may indicate that a given machine along the assembly line has a low oil level. The operator will respond to this message by replenishing the oil in the specified reservoir. When this occurs, the sensor detects the rise in the level of the oil and changes the state of the signal sent to the programmable controller 1. The present messaging function is able to detect the reversal of the condition which caused the message to be transmitted and clear the message from the display devices 8 and 12.

This clearing is accomplished on the next scan of the message function rung 268 in the ladder diagram program after the sensor signal changes. When this occurs as shown in the flowchart of FIG. 10, the input mask bit will be set at step 304 causing the execution to advance through steps 306 and 308. At this latter step, since the mapped input bit has made the reverse transition from that which precipitated sending the original message, the mapped input bit will be the same as the bit in the transition pattern causing the program to branch to step 322. At this point, the current value of the mapped input bit will be different from the bit during the last scan of the ladder rung and the program will advance to step 324. This causes the microprocessor 20 to obtain a command for the personal computer which indicates that the message should be cleared. This command is sent by the communication section 3C along with the designation of the processor module 3, the control file 270 and the bit which made the transition to the personal computer 6 at step 314.

The personal computer 6 processes the clear message command in a similar manner to that previously described with respect to a generation of a message. With respect to FIG. 11, the personal computer 6 examines the message data sent from the processor module 3 at step 331 and determines that a clear message command has been received. The program execution branches to step 333 where the personal computer instead of obtaining message text from the disk drive creates message text with all blank characters. This blank text is then employed at steps 336 and 338 to form and transmit a message over the communication network 13 to the marquee display 12. The marquee display 12 receives and handles this message in the same way as it did the previous message except that the alphanumeric characters which it displays are all blanks, thereby clearing the display.

The present messaging function provides a mechanism by which a user of an industrial controller can define a single ladder program rung which will send a given message to an operator upon the occurrence of a certain event. In the preferred embodiment, a minimum amount of data for the message is stored in the processor module of the controller. The data identifies that module, the ladder rung and a condition upon which a message should be sent. When the condition occurs, these data are sent to a personal computer over a communication link.

A single personal computer can be connected to several industrial controllers. The message data received by the computer enables the selection of previously stored alphanumeric text associated with the condition identified the message data. The associated text is displayed by either the personal computer or a device connected to the computer.

The messaging function also can detect when the condition no longer exists. In this event, a command is sent to the personal computer that the message be cleared from the display.

What is claimed is:

1. A programmable controller system comprising:
   a message display apparatus connected to a communication channel;
   a processor means for executing a user control program;
   a first memory which stores the user control program, an input image table containing data representing the states of input devices connected to the programmable controller, and an output image table containing data representing the states of output devices connected to the programmable controller;
   a set of storage locations in said first memory stores an identification of the processor means and data for a plurality of messages with the data for each message including a defined state of a selected input device;
   means for transmitting message data over the communication channel to said display apparatus;
   conductors connecting said processor means, said memory and said means for transmitting; and
   means for enabling the processor means to determine from data in the input image table when one of selected input devices is in the defined state specified in said set of storage locations, and in response thereto sending the identification of the processor means and an indication of the one selected input device to said means for transmitting.

2. The programmable controller system as recited in claim 1 further comprising:
   means which enables the processor means to determine after message data has been sent to said means for transmitting that the one selected input device is no longer in the defined state, and in response thereto send additional message data indicating such fact to said means for transmitting.

3. The programmable controller system as recited in claim 2 wherein said message display apparatus comprises:
   a second memory that stores alphanumeric text for each of the selected input devices;
   means for displaying alphanumeric characters to a user of the programmable controller system; and
   a control means which responds to message data received over the communication channel by obtaining, from said second memory, text that is associated with a selected input device indicated in the received message data, and transmitting the obtained text to said means for displaying, said control means also responds to the additional message data being received over the communication link by terminating a display of previously transmitted text by said means for displaying.

4. The programmable controller system as recited in claim 1 wherein said message display apparatus comprises:
a second memory that stores text for each of the selected input devices;
a control means which responds to message data received over the communication link by obtaining, from said second memory, text that is associated with a selected input device indicated in the received message data; and
means for displaying alphanumeric characters to a user of the programmable controller system, said means for displaying being connected to said control means to display the text obtained form said second memory.

5. A programmable controller for operating a machine comprises:
a processor for executing a user defined control program;
a signal bus connected to said processor;
an input interface circuit connected to said signal bus for receiving data from input devices on the machine;
an output interface circuit connected to said signal bus to transmit messages to an external device for display to an operator of the programmable controller;
a first means, connected to said signal bus, for storing data from the input devices;
a second means, connected to said signal bus, for storing message data and a plurality of expected transitions of data stored in said first means for storing; and
a third means, coupled to the signal bus, for storing a user defined control program which includes a series of ladder logic instructions and a machine language message program, one of the ladder logic instructions initiating execution of the message program, execution of the message program causing the processor to compare each expected transition to the data stored in said first means for storing and in response to such comparison sending the message data from said second means for storing to said output interface circuit when an expected transition occurs.

6. The programmable controller as recited in claim 5 wherein the message data stored in said second means for storing includes an identification of the programmable controller.

7. The programmable controller as recited in claim 5 wherein the message data stored in said second means for storing includes an identification of the specific ladder logic instruction that initiated execution of the message program which caused the processor to send the message data.

8. The programmable controller as recited in claim 5 wherein the message further causes the processor to send an indication of the data that made the expected transition, to said output interface circuit when the expected transition occurs.

9. The programmable controller as recited in claim 5 further comprising a display device connected to said output interface circuit to display a message to a user of the programmable controller in response to said display receiving message data.

10. The programmable controller as recited in claim 9 wherein said display device includes a memory for storing alphanumeric test of the message for display of the user.

11. The programmable controller as recited in claim 9 wherein said display device includes a memory for storing a plurality of alphanumeric messages; and means responsive to message data received from said output interface circuit for selecting one of said messages from the memory for display to the user.

12. The programmable controller system as recited in claim 5 wherein:
the data stored in said set of storage locations for each message also includes a state of the selected input device from an earlier execution of the machine language message program; and
said processor determines whether a selected input device has made an expected transition by comparing data from said first means for storing with the state of the selected input device stored in said set of storage locations.

13. A system for controlling a machine comprises:
(a) a communication link;
(b) programmable controller including:
a processor for executing a user defined control program,
an input interface circuit for receiving data from input devices on the machine,
an output interface circuit connected to transmit operator messages over the communication link,
a first means for storing data received by said input interface circuit from the input devices,
a second means for storing message data and a set of expected transitions of input data stored in said first means for storing,
a third means for storing a user defined control program which includes an instruction to which said processor responds by comparing an expected transition of the set to the input data stored in said first means for storing, and in response to that comparison sends the message data to said output interface circuit when an expected transition occurs, and
a signal bus connected to said processor, said input and output interface circuits and said first, second and third means for storing; and
(c) message display apparatus connected to the communication link and including:
a memory for storing a plurality of operator messages,
means for displaying operator messages to a user of the system, and
means for selecting one of the plurality of operator messages in response to message data received over the communication link and transmitting the selected operator message to said means for displaying.

14. The system as recited in claim 13 wherein the means for selecting and the memory of said message display apparatus are part of a personal computer; and wherein said means for displaying is a marquee display connected to said personal computer by a communication link.

15. The system as recited in claim 13 wherein:

said second means for storing also contains a state of the selected input device from an earlier execution of the control program instruction; and said processor determines whether a selected input device has made an expected transition by comparing data from said first means for storing with the state of the selected input device contained in said second means for storing.

* * * * *